United States Patent
Lavoie et al.

(10) Patent No.: US 9,623,904 B2
(45) Date of Patent: Apr. 18, 2017

(54) TRAILER CURVATURE CONTROL WITH ADAPTIVE TRAILER LENGTH ESTIMATION

(71) Applicant: Ford Global Technologies, LLC, Dearborn, MI (US)

(72) Inventors: Erick Michael Lavoie, Dearborn, MI (US); Christos Kyrtsos, Beverly Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 8 days.

(21) Appl. No.: 14/594,715

(22) Filed: Jan. 12, 2015

(65) Prior Publication Data

US 2015/0344067 A1    Dec. 3, 2015

Related U.S. Application Data

(63) Continuation-in-part of application No. 14/294,489, filed on Jun. 3, 2014, now Pat. No. 9,335,162.

(51) Int. Cl.
*B62D 13/06* (2006.01)
*B60D 1/24* (2006.01)
(Continued)

(52) U.S. Cl.
CPC ............ *B62D 13/06* (2013.01); *B60D 1/245* (2013.01); *B60W 30/00* (2013.01); *B62D 6/002* (2013.01);
(Continued)

(58) Field of Classification Search
CPC ...... B62D 13/06; B62D 6/002; B62D 15/021; B60D 1/245; G01B 21/22
See application file for complete search history.

(56) References Cited

U.S. PATENT DOCUMENTS 3,542,390 A    11/1970    Fikse
3,756,624 A    9/1973    Taylor
(Continued)

FOREIGN PATENT DOCUMENTS

CN    202159367 U    3/2012
DE    3931518 A1    4/1991
(Continued)

OTHER PUBLICATIONS

Wiesel et al, Espacenet Translation of DE 10 2007 061 835 A1, Abstract, Description, Claims and Figures, Jun. 25, 2009, 17 pages.*
(Continued)

*Primary Examiner* — Dale W Hilgendorf
(74) *Attorney, Agent, or Firm* — Raymond Coppiellie; Price Heneveld LLP

(57) ABSTRACT

An apparatus for determining a jackknife condition of a vehicle and trailer is disclosed. The apparatus comprises a processor operable to set an operating range of a hitch angle to a minimum range. The processor monitors the hitch angle while the vehicle is operated in a forward direction and increases the operating range based on the hitch angle observed during the monitoring. The processor is further operable to utilize the increased operating range to prevent a jackknife condition during a guided reverse operation of the vehicle.

20 Claims, 6 Drawing Sheets

(51) Int. Cl.
  *B62D 6/00* (2006.01)
  *G01B 21/22* (2006.01)
  *B62D 15/02* (2006.01)
  *B60W 30/00* (2006.01)
  *H04N 7/18* (2006.01)

(52) U.S. Cl.
  CPC ............ *B62D 15/027* (2013.01); *G01B 21/22* (2013.01); *B62D 15/021* (2013.01); *H04N 7/183* (2013.01); *H04N 7/188* (2013.01)

(56) References Cited

U.S. PATENT DOCUMENTS

| | | |
|---|---|---|
| 3,860,257 A | 1/1975 | Mesly |
| 4,042,132 A | 8/1977 | Bohman et al. |
| 4,735,432 A | 4/1988 | Brown |
| 4,752,080 A | 6/1988 | Rogers |
| 4,848,499 A | 7/1989 | Martinet et al. |
| 5,001,639 A | 3/1991 | Breen |
| 5,108,158 A | 4/1992 | Breen |
| 5,246,242 A | 9/1993 | Penzotti |
| 5,247,442 A | 9/1993 | Kendall |
| 5,523,947 A * | 6/1996 | Breen ............... B62D 13/00 701/36 |
| 5,558,350 A | 9/1996 | Kimbrough et al. |
| 5,586,814 A | 12/1996 | Steiner |
| 6,042,196 A | 3/2000 | Nakamura et al. |
| 6,056,371 A | 5/2000 | Lin et al. |
| 6,292,094 B1 | 9/2001 | Deng et al. |
| 6,351,698 B1 | 2/2002 | Kubota et al. |
| 6,409,288 B2 | 6/2002 | Yoshida et al. |
| 6,494,476 B2 | 12/2002 | Masters et al. |
| 6,498,977 B2 | 12/2002 | Wetzel et al. |
| 6,567,731 B2 | 5/2003 | Chandy |
| 6,806,809 B2 * | 10/2004 | Lee ............... B60D 1/58 701/36 |
| 6,838,979 B2 * | 1/2005 | Deng ............... B62D 13/06 701/72 |
| 6,854,557 B1 | 2/2005 | Deng et al. |
| 6,999,856 B2 | 2/2006 | Lee et al. |
| 7,032,705 B2 | 4/2006 | Zheng et al. |
| 7,117,077 B2 | 10/2006 | Michi et al. |
| 7,136,754 B2 | 11/2006 | Hahn et al. |
| 7,139,650 B2 | 11/2006 | Lubischer |
| 7,154,385 B2 | 12/2006 | Lee et al. |
| 7,165,820 B2 | 1/2007 | Rudd, III |
| 7,219,913 B2 | 5/2007 | Atley |
| 7,319,927 B1 | 1/2008 | Sun et al. |
| 7,690,737 B2 | 4/2010 | Lu |
| 7,715,953 B2 * | 5/2010 | Shepard ............... B60D 1/58 701/1 |
| 7,793,965 B2 | 9/2010 | Padula |
| 7,969,326 B2 | 6/2011 | Sakakibara |
| 8,010,253 B2 | 8/2011 | Lundquist |
| 8,033,955 B2 | 10/2011 | Farnsworth |
| 8,036,792 B2 | 10/2011 | Dechamp |
| 8,108,116 B2 | 1/2012 | Mori et al. |
| 8,170,726 B2 | 5/2012 | Chen et al. |
| 8,244,442 B2 | 8/2012 | Craig et al. |
| 8,260,518 B2 | 9/2012 | Englert |
| 8,267,485 B2 | 9/2012 | Barlsen et al. |
| 8,280,607 B2 | 10/2012 | Gatti et al. |
| 8,374,749 B2 | 2/2013 | Tanaka |
| 8,430,792 B2 | 4/2013 | Noll |
| 8,469,125 B2 | 6/2013 | Yu et al. |
| 8,571,758 B2 | 10/2013 | Klier et al. |
| 8,755,982 B2 | 6/2014 | Heckel et al. |
| 8,755,984 B2 | 6/2014 | Rupp et al. |
| 8,798,860 B2 | 8/2014 | Dechamp |
| 8,909,426 B2 | 12/2014 | Rhode et al. |
| 8,930,140 B2 | 1/2015 | Trombley et al. |
| 9,102,271 B2 | 8/2015 | Trombley et al. |
| 9,108,598 B2 | 8/2015 | Headley |
| 9,132,856 B2 | 9/2015 | Shepard |
| 9,180,890 B2 | 11/2015 | Lu et al. |
| 9,248,858 B2 | 2/2016 | Lavoie et al. |
| 9,315,212 B1 | 4/2016 | Kyrtsos et al. |
| 9,335,162 B2 | 5/2016 | Kyrtsos et al. |
| 9,340,228 B2 | 5/2016 | Xu et al. |
| 2001/0037164 A1 | 11/2001 | Hecker |
| 2001/0052434 A1 | 12/2001 | Ehrlich et al. |
| 2004/0222881 A1 | 11/2004 | Deng et al. |
| 2005/0206225 A1 | 9/2005 | Offerle et al. |
| 2005/0236201 A1 | 10/2005 | Spannheimer et al. |
| 2005/0236896 A1 | 10/2005 | Offerle et al. |
| 2006/0103511 A1 | 5/2006 | Lee et al. |
| 2006/0142936 A1 | 6/2006 | Dix |
| 2007/0027581 A1 | 2/2007 | Bauer et al. |
| 2007/0198190 A1 | 8/2007 | Bauer et al. |
| 2008/0177443 A1 | 7/2008 | Lee et al. |
| 2009/0082935 A1 | 3/2009 | Leschuk et al. |
| 2009/0157260 A1 | 6/2009 | Lee |
| 2009/0198425 A1 | 8/2009 | Englert |
| 2009/0271078 A1 | 10/2009 | Dickinson |
| 2009/0306854 A1 | 12/2009 | Dechamp |
| 2009/0306861 A1 | 12/2009 | Schumann et al. |
| 2009/0326775 A1 | 12/2009 | Nishida |
| 2010/0152989 A1 | 6/2010 | Smith et al. |
| 2011/0087398 A1 | 4/2011 | Lu et al. |
| 2012/0041658 A1 | 2/2012 | Turner |
| 2012/0095649 A1 | 4/2012 | Klier et al. |
| 2012/0200706 A1 | 8/2012 | Greenwood et al. |
| 2012/0271512 A1 | 10/2012 | Rupp et al. |
| 2012/0271514 A1 | 10/2012 | Lavoie et al. |
| 2012/0271515 A1 | 10/2012 | Rhode et al. |
| 2012/0271522 A1 | 10/2012 | Rupp et al. |
| 2012/0283909 A1 | 11/2012 | Dix |
| 2012/0310594 A1 | 12/2012 | Watanabe |
| 2012/0316732 A1 | 12/2012 | Auer |
| 2013/0148748 A1 | 6/2013 | Suda |
| 2013/0179038 A1 | 7/2013 | Goswami et al. |
| 2013/0268160 A1 | 10/2013 | Trombley et al. |
| 2014/0052337 A1 | 2/2014 | Lavoie et al. |
| 2014/0058614 A1 | 2/2014 | Trombley et al. |
| 2014/0058622 A1 | 2/2014 | Trombley et al. |
| 2014/0058655 A1 | 2/2014 | Trombley et al. |
| 2014/0058668 A1 | 2/2014 | Trombley et al. |
| 2014/0067154 A1 | 3/2014 | Yu et al. |
| 2014/0067155 A1 | 3/2014 | Yu et al. |
| 2014/0085472 A1 | 3/2014 | Lu et al. |
| 2014/0121930 A1 | 5/2014 | Allexi et al. |
| 2014/0136052 A1 | 5/2014 | Kossira et al. |
| 2014/0160276 A1 | 6/2014 | Pliefke et al. |
| 2014/0172232 A1 | 6/2014 | Rupp et al. |
| 2014/0188344 A1 | 7/2014 | Lavoie |
| 2014/0188346 A1 | 7/2014 | Lavoie |
| 2014/0210456 A1 | 7/2014 | Crossman |
| 2014/0218506 A1 | 8/2014 | Trombley et al. |
| 2014/0218522 A1 | 8/2014 | Lavoie et al. |
| 2014/0222288 A1 | 8/2014 | Lavoie et al. |
| 2014/0236532 A1 | 8/2014 | Trombley et al. |
| 2014/0249691 A1 | 9/2014 | Hafner et al. |
| 2014/0267688 A1 | 9/2014 | Aich et al. |
| 2014/0267689 A1 | 9/2014 | Lavoie |
| 2014/0267868 A1 | 9/2014 | Mazzola et al. |
| 2014/0267869 A1 | 9/2014 | Sawa |
| 2014/0277942 A1 | 9/2014 | Kyrtsos et al. |
| 2014/0297128 A1 | 10/2014 | Lavoie et al. |
| 2014/0297129 A1 | 10/2014 | Lavoie et al. |
| 2014/0303847 A1 | 10/2014 | Lavoie |
| 2014/0309888 A1 | 10/2014 | Smit et al. |
| 2014/0324295 A1 | 10/2014 | Lavoie |
| 2014/0343795 A1 | 11/2014 | Lavoie |
| 2014/0379217 A1 | 12/2014 | Rupp et al. |
| 2015/0025732 A1 | 1/2015 | Min et al. |
| 2015/0057903 A1 | 2/2015 | Rhode et al. |
| 2015/0066296 A1 | 3/2015 | Trombley et al. |
| 2015/0066298 A1 | 3/2015 | Sharma et al. |
| 2015/0120141 A1 | 4/2015 | Lavoie et al. |
| 2015/0134183 A1 | 5/2015 | Lavoie et al. |
| 2015/0138340 A1 | 5/2015 | Lavoie |
| 2015/0158527 A1 | 6/2015 | Hafner et al. |
| 2015/0203156 A1 | 7/2015 | Hafner et al. |
| 2015/0210317 A1 | 7/2015 | Hafner et al. |

(56) References Cited

U.S. PATENT DOCUMENTS

| | | |
|---|---|---|
| 2015/0217693 A1 | 8/2015 | Pliefke et al. |
| 2015/0232092 A1 | 8/2015 | Fairgrieve et al. |
| 2016/0009288 A1 | 1/2016 | Yu |
| 2016/0052548 A1 | 2/2016 | Singh et al. |
| 2016/0059888 A1 | 3/2016 | Bradley et al. |

FOREIGN PATENT DOCUMENTS

| | | | |
|---|---|---|---|
| DE | 9208595 U1 | 8/1992 | |
| DE | 10154612 A1 | 5/2003 | |
| DE | 102005043466 A1 | 3/2007 | |
| DE | 102005043467 A1 | 3/2007 | |
| DE | 102005043468 A1 | 3/2007 | |
| DE | 102006002294 A1 | 7/2007 | |
| DE | 102007029413 A1 | 1/2009 | |
| DE | 102007061835 * | 6/2009 | ............ B60T 8/1708 |
| DE | 102006035021 B4 | 4/2010 | |
| DE | 102008043675 A1 | 5/2010 | |
| DE | 102009007990 A1 | 8/2010 | |
| DE | 102009012253 A1 | 9/2010 | |
| DE | 102010029184 A1 | 11/2011 | |
| EP | 0418653 A1 | 3/1991 | |
| EP | 1361543 A2 | 11/2003 | |
| EP | 1655191 A1 | 5/2006 | |
| EP | 1810913 A1 | 7/2007 | |
| EP | 2388180 A2 | 11/2011 | |
| EP | 2487454 A2 | 8/2012 | |
| EP | 2551132 A1 | 1/2013 | |
| EP | 2644477 A1 | 10/2013 | |
| FR | 2515379 A1 | 4/1983 | |
| JP | 09267762 A | 10/1997 | |
| JP | 10119739 A | 5/1998 | |
| JP | 2012166580 A | 9/2012 | |
| WO | 0044605 A1 | 8/2000 | |
| WO | 2012059207 A1 | 5/2012 | |
| WO | 2012103193 A1 | 8/2012 | |
| WO | 2013186208 A2 | 12/2013 | |

OTHER PUBLICATIONS

M. Khatib, H. Jaouni, R. Chatila, and J.P. Laumond; "Dynamic Path Modification for Car-Like Nonholonomic Mobile Robots," IEEE, International Conference on Robotics and Automation, Albuquerque, New Mexico, Apr. 1997, 6 pages.

SH. Azadi, H.R. Rezaei Nedamani, and R. Kazemi, "Automatic Parking of an Articulated Vehicle Using ANFIS", Global Journal of Science, Engineering and Technology (ISSN: 2322-2441), 2013, pp. 93-104, Issue No. 14.

F. Cuesta and A. Ollero, "Intelligent System for Parallel Parking of Cars and Tractor-Trailers", Intelligent Mobile Robot Navigation, STAR, 2005, pp. 159-188, Springer-Verlag Berlin Heidelberg.

Haviland, G S, "Automatic Brake Control for Trucks—What Good Is It?", TRID, Society of Automotive Engineers, Sep. 1968, 1 pg.

Altafini, C.; Speranzon, A.; Wahlberg, B., "A Feedback Control Scheme for Reversing a Truck and Trailer Vehicle", IEEE, Robotics and Automation, IEEE Transactions, Dec. 2001, vol. 17, No. 6, 2 pgs.

Claudio Altafini, Alberto Speranzon, and Karl Henrik Johansson, "Hybrid Control of a Truck and Trailer Vehicle", Springer-Verlag Berlin Heidelberg, HSCC 2002, LNCS 2289; 2002, pp. 21-34.

Divelbiss, A.W.; Wen, J.T.; "Trajectory Tracking Control of a Car-Trailer System", IEEE, Control Systems Technology, Aug. 6, 2002, vol. 5, No. 3, 1 pg.

Guanrong, Chen; Delin, Zhang; "Backing up a Truck-Trailer with Suboptimal Distance Trajectories", IEEE, Proceedings of the Fifth IEEE International Conference, vol. 2, Aug. 6, 2002, New Orleans, LA, ISBN:0-7803-3645-3, 1 pg.

"Understanding Tractor-Trailer Performance", Caterpillar, 2006, pp. 1-28.

C. Lundquist; W. Reinelt; O. Enqvist, "Back Driving Assistant for Passenger Cars with Trailer", ZF Lenksysteme GmbH, Schwäbisch Gmünd, Germany, 2006 (SAE Int'l) Jan. 2006, pp. 1-8.

Olof Enqvist, "AFS-Assisted Trailer Reversing," Institutionen för systemteknik Deartment of Electrical Engineering, Jan. 27, 2006, 57 pgs.

Cedric Pradalier, Kane Usher, "Robust Trajectory Tracking for a Reversing Tractor-Trailer System", (Draft), Field and Service Robotics Conference, CSIRO ICT Centre, Jul. 2007, 16 pages.

Hodo, D. W.; Hung, J.Y.; Bevly, D. M.; Millhouse, S., "Effects of Sensor Placement and Errors on Path Following Control of a Mobile Robot-Trailer System", IEEE, American Control Conference, Jul. 30, 2007, 1 pg.

Cedric Pradalier, Kane Usher, "Experiments in Autonomous Reversing of a Tractor-Trailer System", 6th International Conference on Field and Service Robotics, inria-00195700, Version 1, Dec. 2007, 10 pgs.

Zhe Leng; Minor, M., "A Simple Tractor-Trailer Backing Control Law for Path Following", IEEE, Intelligent Robots and Systems (IROS) IEEE/RSJ International Conference, Oct. 2010, 2 pgs.

"2012 Edge—Trailer Towing Selector", Brochure, Preliminary 2012 RV & Trailer Towing Guide Information, 2011, 3 pgs.

"Ford Super Duty: Truck Technologies", Brochure, Sep. 2011, 2 pgs.

J. Roh; H. Lee; W. Chung, "Control of a Car with a Trailer Using the Driver Assistance System", IEEE, International Conference on Robotics and Biomimetics; Phuket, Thailand, Dec. 2011, 6 pages.

Payne, M.L.;Hung, J.Y, and Bevy, D.M; "Control of a Robot-Trailer System Using a Single Non-Collacted Sensor", IEEE, 38th Annual Conference on IEEE Industrial Electronics Society, Oct. 25-28, 2012, 2 pgs.

"Optionally Unmanned Ground Systems for any Steering-Wheel Based Vehicle" Universal. Unmanned., Kairos Autonomi, website: http://www.kairosautonomi.com/pronto4_system.html, retrieved Sep. 26, 2014, 2 pgs.

Micah Steele, R. Brent Gillespie, "Shared Control Between Human and Machine: Using a Haptic Steering Wheel to Aid in Land Vehicle Guidance", University of Michigan, Date Unknown, 5 pgs.

\* cited by examiner

TRAILER CURVATURE CONTROL WITH ADAPTIVE TRAILER LENGTH ESTIMATION

CROSS-REFERENCE TO RELATED APPLICATION

This patent application is a continuation-in-part of U.S. Pat. No. 9,335,162, which was filed on Jun. 3, 2014, entitled "TRAILER LENGTH ESTIMATION IN HITCH ANGLE APPLICATIONS." The aforementioned related application is hereby incorporated by reference in its entirety.

FIELD OF THE INVENTION

The disclosure relates generally to a method for modeling the operation of a vehicle, and more particularly, to a method for estimating a dimension of a trailer to control the operation of the vehicle.

BACKGROUND OF THE INVENTION

Reversing a vehicle while towing a trailer is very challenging for many drivers. This is particularly true for drivers that are unskilled at backing vehicles with attached trailers, which may include those that drive with a trailer on an infrequent basis (e.g., have rented a trailer, use a personal trailer on an infrequent basis, etc.). One reason for such difficulty is that backing a vehicle with an attached trailer requires steering inputs that are opposite to normal steering when backing the vehicle without a trailer attached. Another reason for such difficulty is that small errors in steering while backing a vehicle with an attached trailer are amplified thereby causing the trailer to depart from a desired path.

SUMMARY OF THE INVENTION

According to one aspect of the present invention, an apparatus for determining a jackknife condition of a vehicle and trailer is disclosed. The apparatus comprises a processor operable to set an operating range of a hitch angle to a minimum range. The processor monitors the hitch angle while the vehicle is operated in a forward direction and increases the operating range based on the hitch angle observed during the monitoring. The processor is further operable to utilize the increased operating range to prevent a jackknife condition during a guided reverse operation of the vehicle.

According to another aspect of the present invention, a method for controlling an operating range of a hitch angle of a vehicle and trailer is disclosed. The method comprises receiving an input to set a trailer length and comparing the input to a minimum trailer length. The method continues by setting the operating range to a minimum range for a trailer in response to the input being less than the minimum trailer length. The hitch angle of the vehicle relative to the trailer is then limited to a minimum range during a guided reverse operation of the vehicle.

According to a further aspect of the present invention, an apparatus for determining jackknife conditions of a vehicle and trailer is disclosed. The apparatus comprises a steering angle detection apparatus operable to measure a steering angle of the vehicle and a hitch angle detection apparatus operable to measure the hitch angle of the trailer relative to the vehicle. Each of the steering angle detection apparatus and the hitch angle detection apparatus are in communication with a processor. The processor is operable to set an operating range of the hitch angle to a minimum range for a trailer and monitor the hitch angle. Based on the hitch angle observed during the monitoring, the operating range of the hitch angle is increased. The processor is further operable to utilize the increased operating range as a maximum hitch angle to prevent a jackknife condition during a guided reverse operation of the vehicle.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
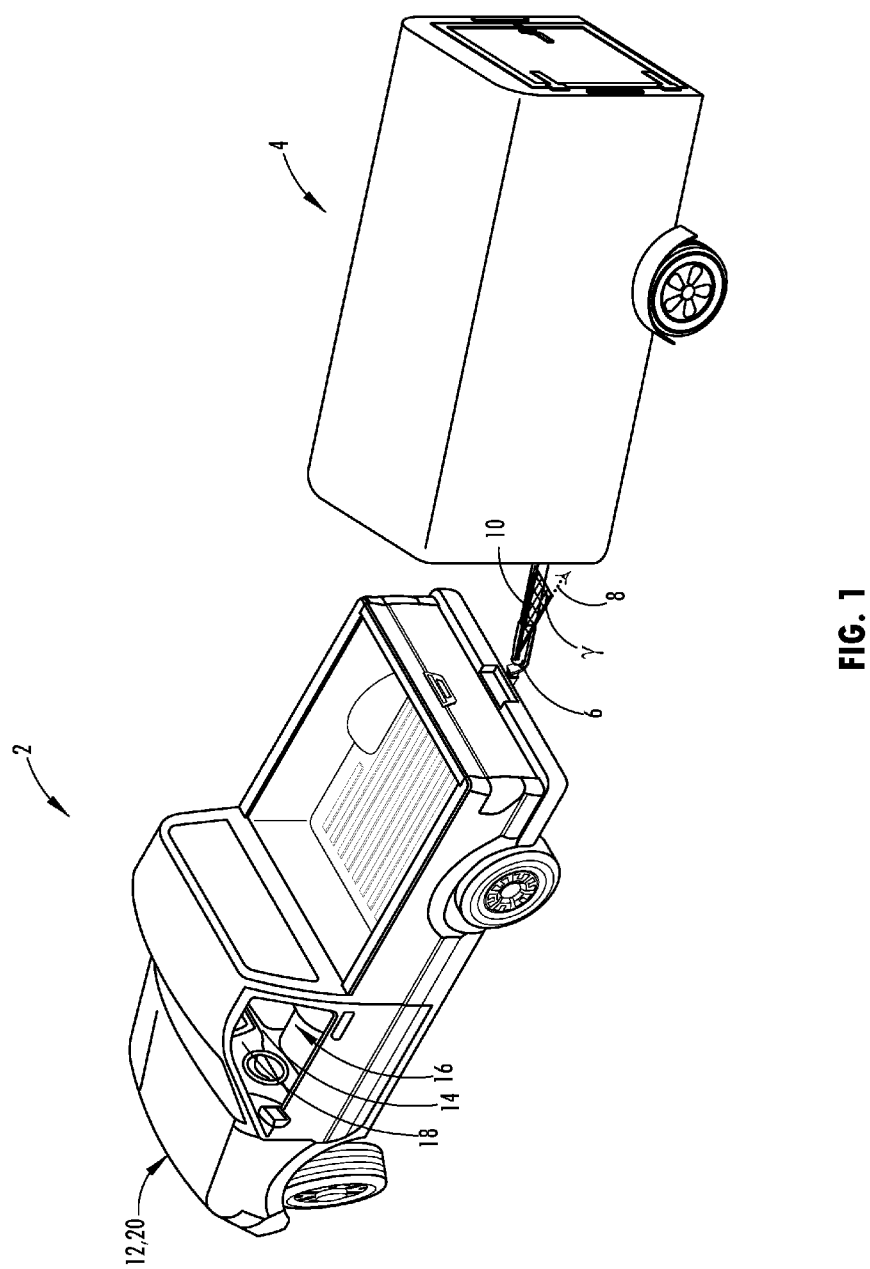
FIG. 1 is a perspective view of a vehicle and a trailer comprising a trailer backup assist system.

While various aspects of the inventive subject matter are described with reference to a particular illustrative embodiment, the inventive subject matter is not limited to such embodiments, and additional modifications, applications, and embodiments may be implemented without departing from the inventive subject matter. In the figures, like reference numbers will be used to illustrate the same components. Those skilled in the art will recognize that the various components set forth herein may be altered without varying from the scope of the inventive subject matter.

The disclosed subject matter is directed to providing trailer backup assist functionality in a manner that is relatively low cost and that offers an intuitive user interface. In particular, such trailer backup assist functionality provides for controlling curvature of a path of travel of a trailer attached to a vehicle (i.e., trailer path curvature control by allowing a driver of the vehicle to specify a desired path of the trailer by inputting a desired trailer path curvature as the backup maneuver of the vehicle and trailer progresses). The various systems and methods disclosed herein may provide audible and/or visual information to the operator of a trailer backup assist system.

Particularly, the methods described herein are directed to a method of utilizing a trailer backup assist system or various systems that may be operable to measure a hitch angle of a trailer relative to a vehicle to determine a maximum controllable hitch angle. The maximum controllable hitch angle may correspond to a maximum angle of a trailer relative to a vehicle undertaking a reverse or backup maneuver based on various dimensional and functional characteristics of the vehicle and the trailer. The maximum controllable hitch angle may be determined by the method while the vehicle and the trailer are operating in a forward direction by monitoring the hitch angle. As such, under steady state conditions, the measurement of the hitch angle of the trailer relative to the vehicle may be utilized to determine the maximum controllable hitch angle. The measurement of the hitch angle of the trailer relative to the vehicle may also be utilized to estimate a length of a trailer.

In various embodiments, the method may provide for a trailer backup assist system to learn or correct a trailer length input by an operator of a vehicle or stored in a memory of a trailer backup assist system. In this way, the systems and methods disclosed provide for a method of setup for a trailer backup assist system that is operable to both learn a trailer length of a trailer utilized by the system, but also is operable to correct a trailer length inputted or stored in a trailer backup assist system. As such, the disclosure provides for improved safety and accuracy in setting up and operating a trailer backup assist system by safely and accurately determining a trailer length and a corresponding maximum hitch angle of a trailer relative to a vehicle.

Referring to FIG. 1, a schematic diagram illustrating a vehicle 2 coupled to a trailer 4 is shown in accordance with the disclosure. The vehicle 2 and the trailer 4 are coupled about a hitch point 6 and are shown in a turning configuration angled at a hitch angle $\gamma$. The hitch angle $\gamma$ is defined by the difference between a vehicle heading 8 and a trailer heading 10 about the hitch point 6. When the trailer 4 is angled relative to the vehicle 2 at the hitch angle $\gamma$, it may be challenging for the operator of the vehicle to determine if the hitch angle $\gamma$ is approaching a jackknife condition and a corresponding maximum hitch angle $\gamma_{max}$.

The vehicle 2 may be equipped with a trailer backup assist system 12 configured to control the vehicle 2 during a reversing or backup operation of the trailer 4. Based on the particular dimensional and functional characteristics of each combination of vehicle and trailer, the trailer backup assist system 12 is operable to maneuver the trailer according to specific dimensional limitations, such as the maximum hitch angle $\gamma_{max}$. As such, for the trailer backup assist system 12 to account for the specific dimensional and functional characteristics of the vehicle and the trailer, certain dimensions must be input and/or identified by alternative measure techniques. The disclosure provides for various methods and techniques that may be utilized to safely determine such dimensions and ensure efficient and safe operation of the trailer backup assist system 12.

The backup assist system 12 is controlled by the operator of the vehicle 2 via an interface configured to receive a directional input, for example a steering input apparatus 14 disposed in a passenger compartment 16 of the vehicle 2. The steering input apparatus 14 may be configured to control a reversing operation of the vehicle 2 and the trailer 4 by receiving a rotational input corresponding to the hitch angle $\gamma$. As referred to herein, the trailer heading 10 may refer to a trailer heading that will result from a vehicle operator maintaining a current control input into the steering input apparatus 14. The trailer heading 10, the vehicle heading 8, and additional heading information discussed herein may be updated by the trailer backup assist system 12 in response to a detected change in the steering input apparatus 14.

The vehicle 2 is further equipped with a display or screen 18 disposed in the passenger compartment 16. The screen 18 is operably coupled to a display controller 20. In response to the trailer hitch angle $\gamma$ and other kinematic properties of the vehicle 2 and the trailer 4, the display controller 20 may be operable to generate and display a graphical representation of the vehicle heading 8, the trailer heading 10, and in some implementations, may be operable to display a predicted heading on the screen 18. The graphical representation provides a reference for the vehicle operator to utilize to ensure safe operation of the steering input apparatus to maneuver the vehicle 2 and the trailer 4.

Figure 2:
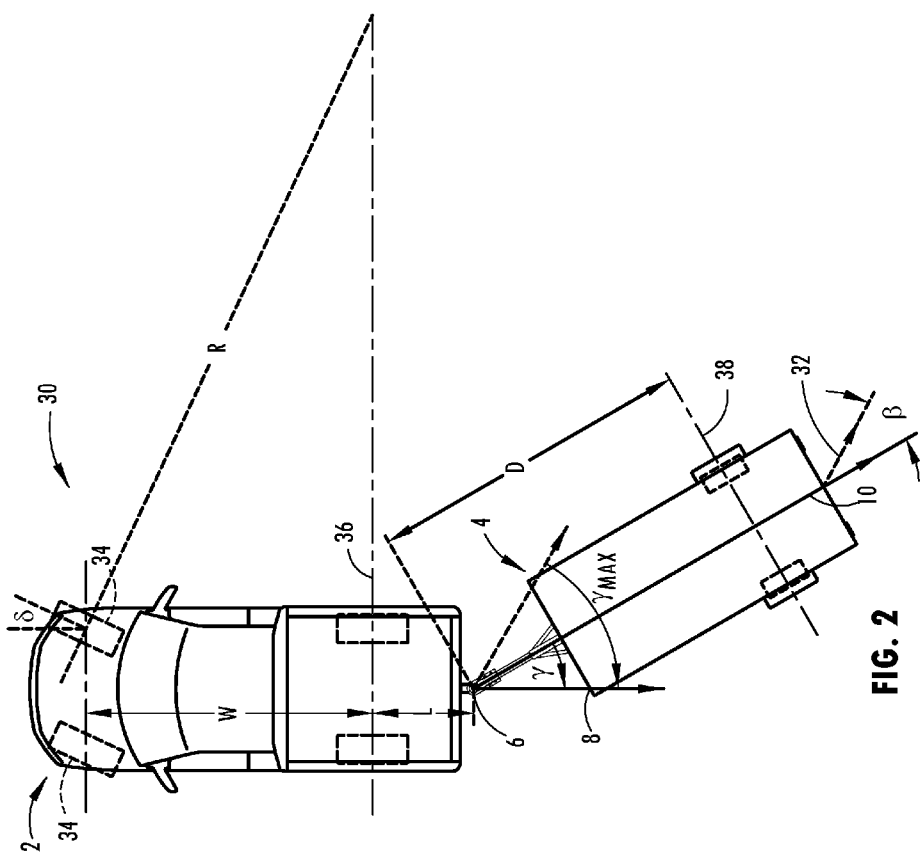
FIG. 2 is a top detail view of a vehicle and a trailer demonstrating a kinematic model of a vehicle and a trailer.
Figure 3:
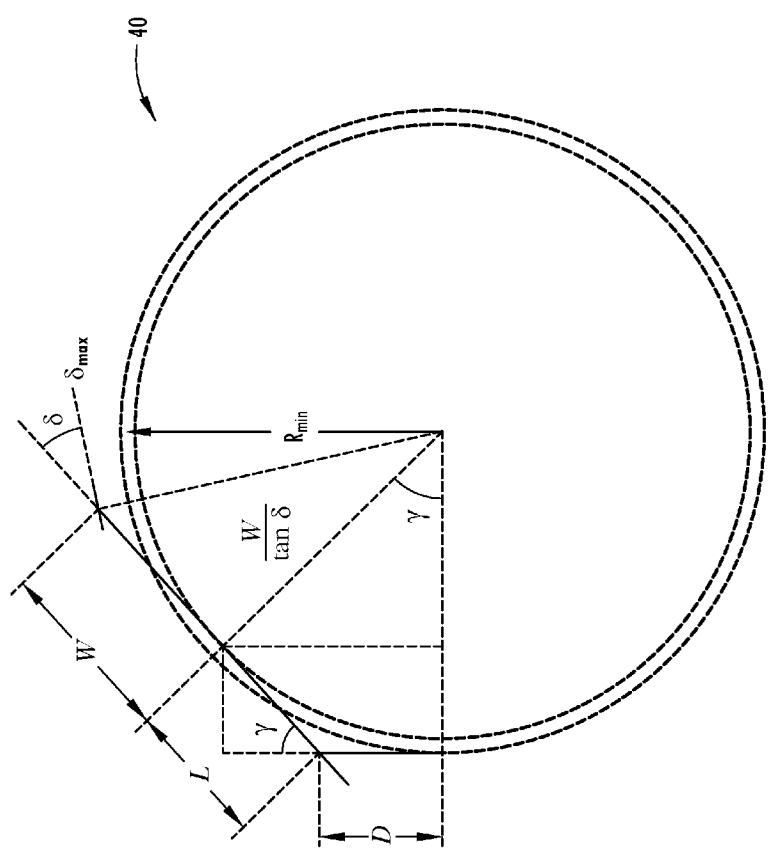
FIG. 3 is a diagram demonstrating a radius of curvature of a vehicle.

Referring to FIGS. 2 and 3, a kinematic model 30 of the vehicle 2 coupled to the trailer 4 is shown. The kinematic model 30 is based on various parameters associated with the vehicle 2 and the trailer 4. From the kinematic model 30, a maximum trailer heading 32 is shown at a maximum hitch angle $\gamma_{max}$ relative to the vehicle 2. The kinematic model 30 parameters include:

$\delta$: steering angle at front wheels 34 of the vehicle 2;
$\gamma$: hitch angle between the vehicle 2 and the trailer 4;
$\gamma$: maximum hitch angle of a particular vehicle 2 and trailer 4;
$\beta$: remaining hitch angle;
W: wheel base of the vehicle 2;
L: length between a hitch point 6 and a rear axle center-line 36 of the vehicle 2;
D: length between hitch point 6 and a trailer axle center-line 38, wherein the position of the rear axle center-line 36 may be an effective, or equivalent, axle length for a trailer having a multiple axle configuration; and
R: radius of curvature of the vehicle 2.

The kinematic model 30 of FIG. 2 relates the dimensions of the vehicle 2 and the trailer 4 to the steering angle $\delta$ and the hitch angle $\gamma$. The steering angle $\delta$ and the hitch angle $\gamma$ may be measured by a plurality of sensors of the trailer backup assist system 12 as discussed further in reference to FIG. 4. From the kinematic model 30, a maximum hitch angle $\gamma_{max}$ and a trailer length D may be determined for a particular vehicle 2 and trailer 4 combination. The maximum hitch angle $\gamma_{max}$ and trailer length D may be determined based on a relationship of the steering angle $\delta$ and the hitch angle $\gamma$ in relation to the radius of curvature R of the vehicle 2. A simplified diagram 40 demonstrating the relationship of the steering angle $\delta$ and the hitch angle $\gamma$ in relation to the radius of curvature R of the vehicle 2 is shown in FIG. 3.

Based on the relationships shown in FIG. 3, the minimum radius of curvature $R_{min}$ for the vehicle 2 is dependent on a maximum steering angle $\delta_{max}$ and the wheel base W of the vehicle 2. The maximum hitch angle $\gamma_{max}$ for the vehicle 2 and the trailer 4 corresponds to the vehicle 2 and the trailer 4 turning at the minimum radius of curvature $R_{min}$. As such, the trailer length D and the $\delta_{max}$ may be determined based on the trigonometric relationship shown demonstrated in Eq. 1.

$$\tan\delta_{max} = \frac{W\sin\gamma_{max}}{D + L\cos\gamma_{max}} \quad \text{(Eq. 1)}$$

The wheel base W, the maximum steering angle $\gamma_{max}$, and length L correspond to static dimensions that may not change when changing from a first trailer to a different, second trailer. The static dimensions of the vehicle 2 may correspond to dimensions that are not generally subject to change based on many common hitching configurations. As such, a control module of the trailer backup assist system 12 may be configured to calculate the maximum hitch angle $\gamma_{max}$ using Eq. 2. It is noted that the methods and equations discussed may be utilized similarly for other common hitching configurations, such as fifth wheel hitching configurations.

$$\cos\gamma_{max} = \frac{-b \pm \sqrt{b^2 - 4ac}}{2a}, \text{ wherein:} \quad \text{(Eq. 2)}$$

-continued $$a = L^2\tan^2\delta_{max} + W^2;$$
$$b = 2LD\tan^2\delta_{max}; \text{ and}$$
$$c = D^2\tan^2\delta_{max} - W^2.$$

Based on Eq. 2, it is shown that the maximum hitch angle $\gamma_{max}$ may be determined based on the trailer length D and the static dimensions of the vehicle 2. In this way, the trailer length D may be input by an operator of the trailer backup assist system 12 in order to calculate the maximum hitch angle $\gamma_{max}$.

In operation, the trailer backup assist system 12 may be configured to underestimate the trailer length in order to ensure that safe operation of a trailer backup assist function may be accomplished even if the trailer length is unknown. For example, if the trailer length is unknown, the system 12 may be configured to assign a minimum trailer length as the trailer length D. By utilizing the minimum trailer length as the trailer length in Eq. 2, the maximum hitch angle $\gamma_{max}$ is underestimated for the vehicle 2 and trailer 4. As such, the maximum hitch angle $\gamma_{max}$ calculated based on the minimum trailer length ensures that the controller of the trailer backup assist system 12 will control the hitch angle $\gamma$ within an underestimated range. Underestimating the safe operating range of the hitch angle 8 may ensure that the trailer 4 is not accidentally placed in a jackknife condition during a reversing operation.

While underestimating the trailer length D and the corresponding maximum hitch angle $\gamma_{max}$ may ensure safe operation of the trailer backup assist system 12, it may also limit the utility of the system 12 by limiting the maximum hitch angle $\gamma_{max}$. To ensure that safe operation and maximum performance are achieved, the system 12 provides for improving the trailer length D programmed into the system 12 by estimating the trailer length by utilizing Eq. 3. Eq. 3 may be used to update and improve the trailer length D during forward operation of the vehicle 2 while monitoring the hitch angle $\gamma$ of the trailer 4.

$$D_{calc} = \left(\frac{W\sin\gamma_{max}}{\tan\delta_{max}}\right) - L\cos\gamma_{max} \quad \text{(Eq. 3)}$$

The estimated trailer length as $D_{calc}$ is calculated by measuring and updating the maximum hitch angle $\gamma_{max}$ of the trailer 4 during forward motion of the vehicle 2. By monitoring and updating the maximum hitch angle $\gamma_{max}$ the trailer length D corresponding to the actual dimensions of the trailer may be improved. According to Eq. 2, an increase in the trailer length D results in an increase in the maximum hitch angle $\gamma_{max}$. By updating and calculating the max hitch angle $\gamma_{max}$ and the trailer length D, the system 12 is operable to improve the performance of a reverse or backup operation of the vehicle 2 and the trailer 4. The performance is improved by accurately estimating the trailer length D and consequently increasing the maximum hitch angle $\gamma_{max}$. In operation, this means that system 12 is operable to automatically configure the kinematic model 30 including the trailer length D and the maximum hitch angle $\gamma_{max}$ by operating the vehicle 2 in the forward direction through a range of steering angles and corresponding hitch angles.

Figure 4:
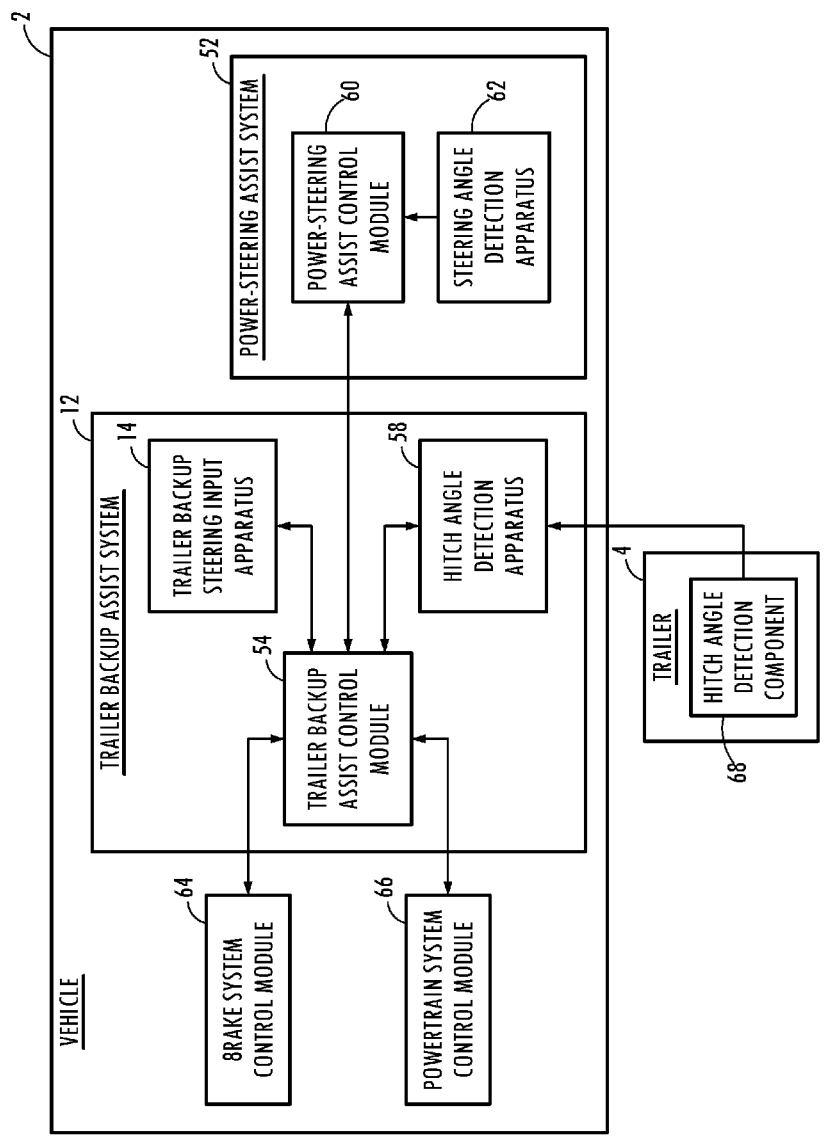
FIG. 4 is a block diagram of a trailer backup assist system.

Referring to FIG. 4, a block diagram of the trailer backup assist system 12 of the vehicle 2 is shown. The trailer backup assist system 12 is operable to control the curvature of path of the trailer 4 by adjusting the vehicle 2 in response to the steering input apparatus 14. The backup assist system 12 operates by controlling the steering of the vehicle 2 via a power steering assist system 52. The steering input apparatus 14 may comprise a touchscreen, knob or other various forms of input devices, and in some implementations may be in communication with a human machine interface (HMI) coupled to the screen 18.

The trailer backup assist system 12 includes a trailer backup assist control module 54, the trailer backup steering input apparatus 14, and a hitch angle detection apparatus 58 operable to monitor the hitch angle $\gamma$. The trailer backup assist control module 54 is in communication with the trailer backup steering input apparatus 14 and the hitch angle detection apparatus 58. The control module 54 of the trailer backup assist system 12 is further in communication with a power steering assist control module 60 and may be indirectly in communication with a steering angle detection apparatus 62 of the power steering assist system 52. The trailer backup assist system 12 may also in communication with a brake system control module 64 and a powertrain control module 66 for controlling motion of the vehicle 2 and the trailer 4.

The trailer backup assist control module 54 (e.g., a trailer curvature algorithm thereof) is operable to generate vehicle steering information as a function of information received from the trailer backup steering input apparatus 14, the hitch angle detection apparatus 58, the power steering assist control module 60, the brake system control module 64, and the powertrain control module 66. In operation, the trailer backup assist control module 54 is operable to maneuver the vehicle 2 to achieve a commanded curvature of a path for the trailer 4. The path of travel and the hitch angle $\gamma$ are adjusted in response to an operator input into the steering input apparatus 14. The control module is further operable to adjust the hitch angle $\gamma$ of the trailer 4 relative to the vehicle in response to a hitch angle $\gamma$ received from the hitch angle detection apparatus 58. Further detailed implementations of a trailer backup assist module are described in further detail in U.S. patent application Ser. No. 14/294,489, which is incorporated herein by reference in its entirety.

The hitch angle detection apparatus 58 may operate in conjunction with a hitch angle detection component 68 which may be coupled to the vehicle 2 or the trailer 4. The hitch angle detection apparatus 58 may be utilized in combination with the hitch angle detection component 68 to communicate information relating to the hitch angle $\gamma$ to the trailer backup assist control module 54. The hitch angle detection apparatus 58 may be implemented by proximity or distance sensors (e.g. an ultrasonic sensor), a camera-based sensor configured to visually monitor a target, or any angular measurement device. The hitch angle detection apparatus 58 may also be implemented as a device mounted proximate the hitch point 6 to measure the hitch angle $\gamma$. The trailer backup assist system 12 as discussed herein provides an intuitive system for maneuvering the vehicle 2 and the trailer 4 by monitoring and controlling the hitch angle $\gamma$ during a reverse operation.

Figure 5:
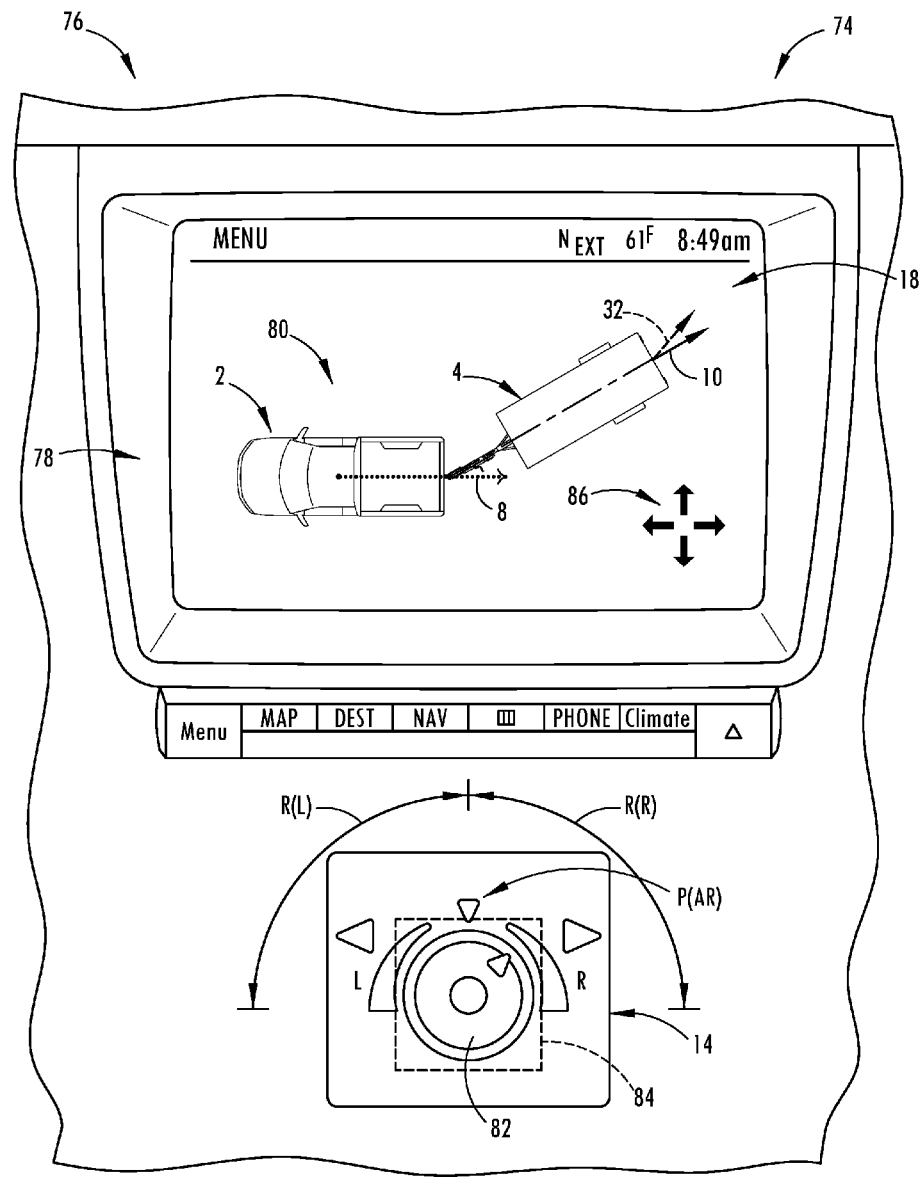
FIG. 5 is a diagram of a center console of a vehicle comprising a steering input apparatus.

Referring now to FIG. 5, the steering input apparatus 14 is shown as a component of an interface 74 configured to receive a directional input to control the trailer backup assist system 12. The steering input apparatus 14 may be disposed in a center console portion 76 of the passenger compartment 16 of the vehicle 2 as an input device in communication with an HMI 78. The HMI 78 may further be in communication with the display controller 20 and the screen 18 to provide the operator of the vehicle 2 with reference information generated by the display controller 20. The reference information may include a graphical representation 80 of the vehicle 2 and the trailer 4 including the maximum trailer heading 32 to assist the operator of the vehicle in utilizing the steering input apparatus 14.

In some implementations, the steering input apparatus 14 may comprise a rotatable control element in the form of a knob 82. The knob 82 is further coupled to a movement sensing device 84. The knob 82 may be biased (e.g., by a spring return) to an at-rest position P(AR) between opposing rotational ranges of motion R(R), R(L). A force that biases the knob 82 toward the at-rest position P(AR) can increase (e.g., non-linearly) as a function of the amount of rotation of the knob 82 with respect to the at-rest position P(AR). Even in a spring biased configuration, an operator may have difficulty determining a relative position of the knob 82 and a corresponding trailer heading 10 in response to an input. The graphical representation 80 provides visual feedback to the operator to improve the intuitive nature of the steering input apparatus 14.

For example, as shown in FIG. 5, the knob 82 is rotated in the direction of the right rotational range R(R). In response to the rotation detected by the sensing device 84 of the steering input apparatus 14, the trailer backup assist control module 54 has positioned the vehicle such that the trailer 4 is angled toward a passenger side of the vehicle 2 as shown in the graphical representation 80. To assist the driver in operation of the vehicle 2, the display controller 20 includes the vehicle heading 8, the trailer heading 10, and the maximum trailer heading 32, as calculated from Eq. 2. The maximum trailer heading 32 may notify the operator of the vehicle 2 of a maximum hitch angle $\gamma_{max}$ that may be achieved to maneuver the trailer 4.

Though the steering input apparatus 14 is discussed in detail in reference to the knob 82 and a corresponding rotating configuration, the steering input apparatus 14 may be implemented by any form of user input configured to direct the vehicle 2 and the trailer 4. For example, in some implementations, the screen 18 may be configured as a touchscreen. The touchscreen may be of any type suited to a particular application and may be resistive, capacitive, surface acoustic wave, infrared, or optical. The touchscreen may utilize a plurality of soft keys in communication with the display controller 20 and the trailer backup assist system 12 to select a location or path for the vehicle 2 and the trailer 4. The touchscreen may further provide options for the operator to select the vehicle 2 or the trailer 4 and control a direction of each via a plurality of directional inputs 86.

In some implementations, the HMI 78 may provide feedback to an operator of the vehicle 2 while the operator is waiting for the vehicle 2 to complete a command received by the trailer backup assist control module 54. For example, the HMI 78 may provide feedback to the operator during control tasks and maneuvers of the vehicle 2 and the trailer 4 that may require an extended period to execute. In this way, the HMI 78 may provide a reassurance to the driver that the trailer backup assist control module 54 is functioning properly. The feedback may also serve to limit an operator from prematurely adjusting an input to the steering input apparatus 14 prior to the completion of a control task.

The HMI 78 and the knob 82 may be configured to provide feedback to the operator of the vehicle 2 in a variety of ways. For example, a notification may be displayed on the screen 18 showing a remaining change in the trailer heading 10 based on an input received by the steering input apparatus. In some implementations, the remaining change in the trailer heading 10 may be displayed numerically on the screen 18 as an angle. The remaining change may also be displayed by updating the graphical representation 80 and/or the direction of the arrows denoting the trailer heading 10. The graphical representation 80 may further be configured to flash on and off during the completion of a control task. One or more icons or symbols may also be overlaid on the screen notifying the operator that the trailer backup assist system 12 is active.

The operator of the vehicle 2 may further be provided feedback for a turning operation of the trailer backup assist system 12 by audible or tactile feedback that may be provided by the HMI 78 and/or additional systems in the vehicle 2. In some implementations, a steering wheel of the vehicle may vibrate or oscillate in response to conditions requiring that the steering angle δ be maintained at a maximum steering angle to complete a steering maneuver. Also, periodic audible tones may be provided through one or more speakers in the vehicle 2. The audible tones may increase in frequency as the vehicle heading 8 approaches the maximum hitch angle $\gamma_{max}$ with the trailer heading 10 (e.g. a jack knife condition). As the hitch angle γ decreases, the audible tone may change from continuous or high frequency tones to less frequent tones until the hitch angle γ is approximately zero and the tone stops.

In some implementations, a steering warning may be displayed on the screen 18 alerting the operator of the vehicle 2 that the hitch angle γ is approaching the maximum hitch angle $\gamma_{max}$. Additionally, a steering error may be displayed on the screen 18 alerting the operator that the hitch angle γ has exceeded the maximum hitch angle $\gamma_{max}$. The steering error displayed on the screen 18 may inform the operator that the vehicle 2 must be pulled forward to avoid a jackknife condition. In this way, the system 12 may alert the operator of the vehicle 2 that the steering angle γ as calculated by the method disclosed herein may be exceeded such that the operator may correct a current direction of the trailer 4 to avoid an error condition.

Figure 6:
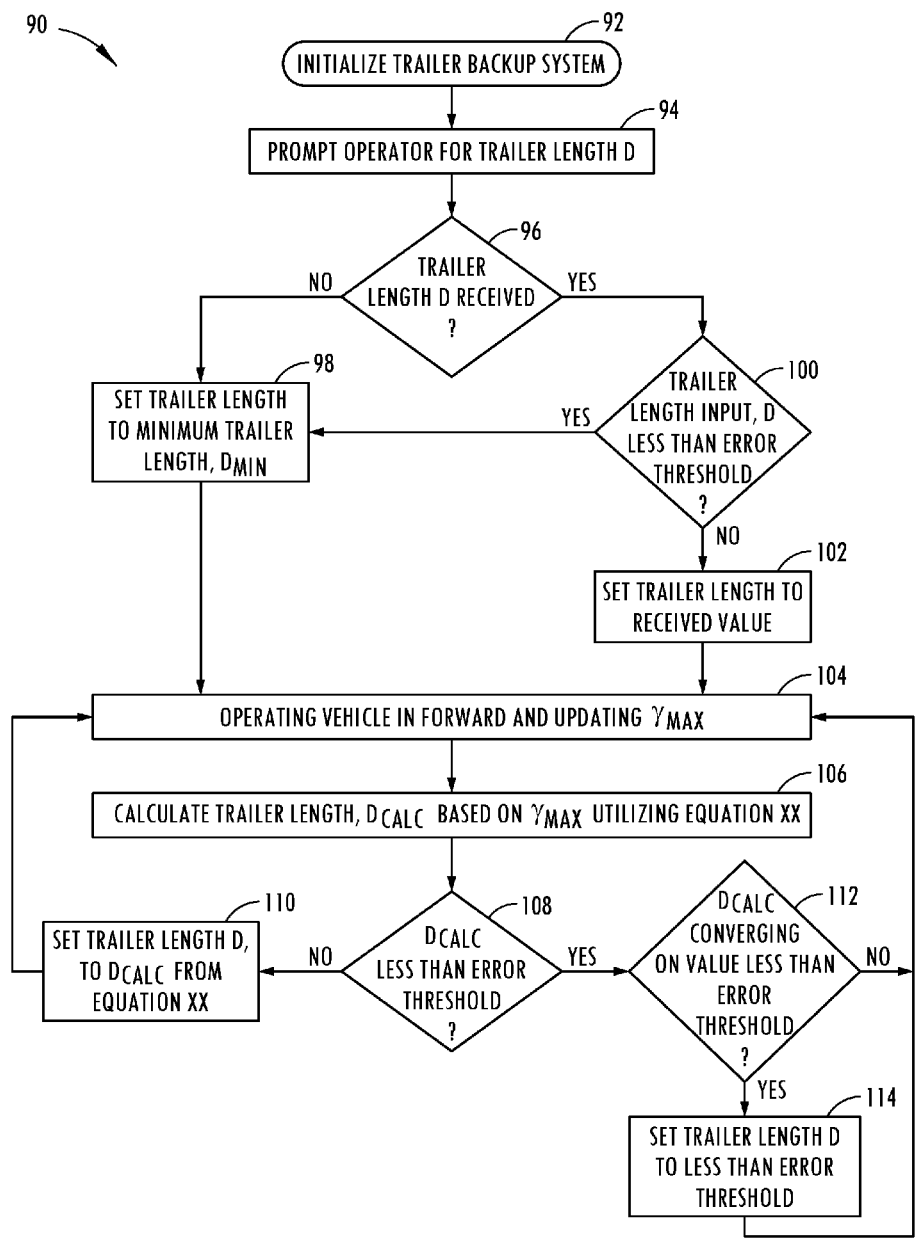
FIG. 6 is a flow chart of a method for estimating a trailer length based on a hitch angle of a trailer relative to a vehicle in accordance with the disclosure.

Referring now to FIG. 6, a method 90 for operating the trailer backup assist system 12 is shown. The method may begin by initializing the trailer backup assist system 12 (92). The trailer backup assist system 12 may be initialized in response to the connection of a trailer 4 to the hitch of the vehicle 2. In response to the initialization of the trailer backup assist system 12, the control module 54 may cause the display controller 20 to display a prompt on the screen 18 requesting that the operator input a trailer length D (94). In decision block 96, if the trailer length D is not received, the trailer length D may be set to a minimum trailer length $D_{min}$ by proceeding to step 98. In decision block 96, if the trailer length D is received, the method 90 may complete an additional decision step 100.

In decision step 100, the received trailer length D may be compared to an error threshold or the minimum trailer length $D_{min}$. If the received trailer length D is less than the minimum trailer length $D_{min}$, the method 90 may set the trailer length D to the minimum trailer length $D_{min}$ by proceeding to step 98. If the received trailer length D is not less than the minimum trailer length $D_{min}$, the method 90 may set the trailer length D to the received trailer length by proceeding to step 102. Steps 92 to 102 may serve as initialization or initial setup steps for the trailer length D. Based on these steps it may be noted that the trailer length may initially set to a low estimate or minimum trailer length to ensure that the maximum hitch angle $\gamma_{max}$ is underestimated. In this configuration, the trailer backup assist system 12 can avoid approaching a jackknife condition even if the trailer length D is unknown.

The minimum trailer length $D_{min}$ may correspond to a variety of lengths that may correspond to a particular style and/or type of vehicle 2 utilizing the trailer backup assist system 12. In some embodiments, a minimum trailer length $D_{min}$ may correspond to a minimum length of trailer that is supported for backup assistance by the trailer backup assist system 12. The minimum trailer length $D_{min}$ may also correspond to an average minimum trailer length based on customer surveys for a particular make and model of the vehicle 2. In an exemplary embodiment, the minimum trailer length $D_{min}$ may be approximately 1 m. Accordingly, the system is configured to underestimate the maximum hitch angle $\gamma_{max}$ to ensure safe operation.

Following steps 98 or 102, the method 90 may continue to step 104. In step 104, the control module 54 may receive updated hitch angle data from the hitch angle detection apparatus 58 identifying an operating range of the hitch angle $\gamma$ when the vehicle 2 is traveling in the forward direction. The maximum observed value of the hitch angle $\gamma$ of the trailer 4 identified when the vehicle 2 is traveling in the forward direction may be set by the control module to update the maximum hitch angle $\gamma_{max}$. The maximum hitch angle $\gamma_{max}$ may be changed in response to identifying an increased range or increased maximum hitch angle $\gamma_{max}$. Based on the updated maximum hitch angle $\gamma_{max}$ from step 104, the system may further determine a calculated trailer length $D_{calc}$ by utilizing Eq. 3 (106). In this way, the system is operable to improve an input or calculated trailer length D such that the operating range corresponding to the maximum hitch angle $\gamma_{max}$ may be improved and increased in response to observed hitch angles $\gamma$ identified while the vehicle 2 is operating in the forward direction.

As an additional safety precaution, the system 12 may continue to decision step 108 to determine if the calculated trailer length $D_{calc}$ is less than the error threshold or the minimum trailer length $D_{min}$. If the calculated trailer length $D_{calc}$ is not less than the minimum trailer length $D_{min}$, the method 90 may continue to step 110 to set the trailer length D to the calculated trailer length $D_{calc}$. If the calculated trailer length $D_{calc}$ is less than the minimum trailer length $D_{min}$, the method 90 may continue to decision step 112 to determine if the value of $D_{calc}$ converges toward a value less than the minimum trailer length $D_{min}$. If the calculated trailer length $D_{calc}$ converges toward a value less than the minimum trailer length $D_{min}$, for a plurality of cycles or calculations over time, the control module 54 may set the trailer length D to a value less than the minimum trailer length $D_{min}$ in step 114.

If in decision step 112, the control module 54 does not identify that the calculated trailer length $D_{calc}$ is converging toward a value less than the minimum trailer length $D_{min}$, the control module 54 may continue to step 104 to update and observe hitch angle $\gamma$ while the vehicle is operating in the forward direction. Over time the trailer length may converge toward an increased trailer length. The increased trailer length will allow the trailer backup assist system 12 to increase an operating range for maneuvering by estimating the maximum hitch angle $\gamma_{max}$ as discussed herein. In this way the system 12 may provide for an accurate estimation of a trailer length and improve a maneuvering range while avoid jackknife conditions.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. An apparatus for determining jackknife conditions of a vehicle comprising:
   a hitch sensor configured to identify a hitch angle;
   a processor operable to:
   set an operating range of the hitch angle to a minimum range;
   monitor the hitch angle while the vehicle is operated in a forward direction;
   increase the operating range to an increased range according to the hitch angle detected during the monitoring;
   set a maximum hitch angle to the increased range; and
   output a control signal indicating a jackknife condition in response to the hitch angle exceeding the maximum hitch angle during a guided reverse operation of the vehicle.

2. The apparatus according to claim 1, wherein the operating range corresponds to the hitch angle of a trailer relative to the vehicle such that the hitch angle does not reach the jackknife condition.

3. The apparatus according to claim 1, wherein the operating range is increased to a maximum hitch angle observed during the monitoring.

4. The apparatus according to claim 1, wherein the vehicle comprises a trailer backup assist apparatus operable to maneuver the vehicle and the trailer in reverse and control the hitch angle.

5. The apparatus according to claim 1, wherein the minimum range corresponds to a minimum expected trailer length.

6. The apparatus according to claim 1, wherein a trailer length is calculated based on a maximum hitch angle observed and a maximum steering angle for the vehicle.

7. The apparatus according to claim 6, wherein the maximum hitch angle is utilized to calculate the trailer length.

8. The apparatus according to claim 1, wherein the processor is in communication with a steering angle detection apparatus operable to measure a steering angle of the vehicle.

9. The apparatus according to claim 1, wherein the processor is in communication with a hitch angle detection apparatus operable to measure the hitch angle of the trailer relative to the vehicle.

10. The apparatus according to claim 1, wherein the minimum range corresponds to minimum input trailer length for determining the jackknife condition.

11. A method for controlling an operating range of a hitch angle comprising:
    receiving an input identifying a selected trailer length;
    comparing the selected trailer length to a minimum trailer length, wherein the minimum trailer length corresponds to a predetermined value;
    setting the operating range to a minimum range for a trailer in response to the selected trailer length being less than the minimum trailer length;
    detecting the hitch angle with a hitch sensor; and
    limiting the hitch angle to the minimum range thereby controlling a reverse operation of the vehicle.

12. The method according to claim 11, further comprising monitoring the hitch angle while the vehicle is operated in a forward direction.

13. The method according to claim 12, further comprising increasing the operating range based on the hitch angle observed during the monitoring.

14. The method according to claim 13, wherein increasing the operating range comprises identifying a maximum hitch angle achieved while the vehicle is operated in the forward direction.

15. The method according to claim 14, wherein the operating range of the hitch angle is set to the maximum hitch angle achieved in the forward direction.

16. The method according to claim 15, further comprising utilizing the operating range of the hitch angle to prevent a jackknife condition during the guided reverse operation of the vehicle.

17. An apparatus for determining jackknife conditions of a vehicle and trailer comprising:
a processor in communication with:
a steering angle detection apparatus operable to measure a steering angle of the vehicle; and
a hitch angle detection apparatus operable to measure a hitch angle of the trailer relative to the vehicle, wherein, the processor is operable to:
set an operating range of the hitch angle to a minimum range for a trailer;
monitor the hitch angle;
increase the operating range to an increased range based on the hitch angle observed during the monitoring;
set a maximum hitch angle to the increased range, and
output a control signal indicating the hitch angle exceeding the increased range to prevent a jackknife condition during a guided reverse operation of the vehicle.

18. The apparatus according to claim 17, wherein the operating range of the hitch angle is set to the maximum hitch angle achieved in a forward direction.

19. The apparatus according to claim 18, wherein the processor is further operable to:
calculate a trailer length based on the maximum hitch angle and a maximum steering angle for the vehicle.

20. The apparatus according to claim 17, wherein the processor is in communication with a trailer backup assist apparatus operable to maneuver the vehicle and the trailer in reverse and control the hitch angle.

* * * * *